United States Patent Office 2,922,818
Patented Jan. 26, 1960

2,922,818
PROCESS FOR THE PRODUCTION OF ETHYLENE DIAMINE

Georg Spielberger and Friedrich Mott, Leverkusen-Bayerwerk, Germany, assignors to Farbenfabriken Bayer Aktiengesellschaft, Leverkusen, Germany, a corporation of Germany No Drawing. Application December 27, 1956
Serial No. 630,755

Claims priority, application Germany December 29, 1955

5 Claims. (Cl. 260—583)

The present invention relates to a process for the production of ethylene diamine.

It is known that ethylene diamine forms a constant boiling mixture with water which has a content of 85% of ethylene diamine and which boils at 118.5° C. at a pressure of 760 mm. Hg. Anhydrous ethylene diamine boils at a lower temperature of 116.2° C. By fractional distillation of aqueous ethylene diamine, such as that formed in production, it is only possible at the most to obtain an 85% pure ethylene diamine. Anhydrous ethylene diamine can only be obtained by repeated distillation of the ethylene diamine over metallic sodium or by thermal decomposition of certain complex salts (J. C. Bailer, Journal of the American Chemical Society 56 (1934). It is also known that anhydrous ethylene diamine can be obtained from aqueous ethylene diamine by repeated heating of the latter for several hours in a sealed tube with freshly melted sodium hydroxide (Kraut, Rhoussopoulos und Meyer, Liebigs Annalen der Chemie, 212, 225 (1882)). This process can however only be carried out on a laboratory scale.

It is an object of the present invention to provide a novel process for preparing anhydrous ethylene diamine. A further object is to provide a novel process for the production of ethylene diamine having only a small content of water. Another object is to provide a process for highly concentrated ethylene diamine which can be carried out on a technical scale. More objects will appear hereinafter.

As we have found aqueous ethylene diamine can be dehydrated very easily and in a technically simple manner if the vapours of aqueous ethylene diamine are subjected to a treatment with an alkali metal hydroxide or a concentrated aqueous alkali metal hydroxide solution.

The process according to the invention can be carried out in such a manner that the aqueous vapours of the ethylene diamine are first conducted in countercurrent over a preferably highly-concentrated alkali metal hydroxide solution. Sodium hydroxide is used preferably as alkali metal hydroxide. This is advantageously carried out in an exchanger column of suitable dimensions, for example, a bubble plate column or a Raschig ring column, into which the aqueous ethylene diamine vapour is introduced at the bottom end while the concentrated ethylene diamine is obtained at the top end of the column. The caustic alkali solution is fed into the exchanger column in the upper part and is removed from the bottom end of the column. In a preferred embodiment of the invention an aqueous ethylene diamine is used as starting material with an ethylene diamine content of about 75–85% and a hot alkali metal hydroxide solution with a concentration higher than 60%, preferably 73–80%, is supplied in countercurrent. Thus, a very highly concentrated ethylene diamine is obtained. Especially good results are obtained if the exchanger column contains at the top end a layer of lumpy caustic alkali. If the process is carried out in this manner it is in general unnecessary to add caustic soda solution.

If the dehydration of the ethylene diamine is carried out continuously there can be used directly the 75–82% ethylene diamine concentrates obtained by the thermal distillation of diluted aqueous ethylene diamine which are continuously introduced as vapour into the bottom of the dehydration column. The dehydration can be carried out at normal pressure, under slight vacuum—e.g. at 200 mm. Hg—or under positive pressure, for example at a superatmospheric pressure of about 1 atmosphere.

Separate heating of the sump of the hydration column is only necessary with extremely small installations. Larger installations must be slightly cooled in order to discharge the heat of hydration of the caustic soda, since otherwise considerable rises in temperature can occur in the caustic soda. This cooling can be effected from outside or better still by returning some of the condensed anhydrous diamine.

Example I 890 grams of 78% ethylene diamine are introduced per hour as a vapour at a temperature of 119° C. into the bottom of a column with 7 bubble plates each with a diameter of 25 mm. After passing upwardly through the bubble plates, the vapour is conducted through a bed of sodium hydroxide in pellet form with a height of 200 mm. and is condensed after leaving the column. In this way, there are hourly obtained 700 grams of ethylene diamine (99.0 to 99.6% pure). Since some of the solid caustic soda melts, the corresponding amount is constantly replaced through a controlled-feed device. The caustic soda solution which is formed discharges in a downward direction through the bubble plates and is removed by way of a heated siphon from the column. The water content is 38–42%, the ethylene diamine content 0.1–1%. In this way, 780 grams of substantially anhydrous diamine are recovered from 1 kg. of 75% ethylene diamine, by using approximately 320–340 grams of caustic soda.

Example II

A layer of small Raschig rings with a height of 50 mm. is arranged on a column with 7 bubble plates and an internal diameter of 25 mm., and a bed of solid sodium hydroxide with a height of 300 mm. is arranged above the said Raschig rings. The vapour of 85.9% ethylene diamine is introduced from below at a rate of 1.0 kg. per hour.

The solid sodium hydroxide is replenished by a controlled-feed device at the rate at which it is consumed, so that the height of the layer remains constant. In 6½ hours, 5.0 kg. of 99.9% ethylene diamine are obtained from 5850 grams of initial material, with a consumption of 820 grams of sodium hydroxide, which form approximately 870 cc. of 60% alkaline solution.

Instead of the sodium hydroxide there can be used also potassium hydroxide.

Example III

In the column described in the foregoing examples there is introduced upon the upper one of the 7 bubble plates a 75% sodium hydroxide lye. In the lower end of the column there is introduced the vapour of the 78% ethylene diamine. The dehydrated ethylene diamine is obtained at the upper end of the column and at the bottom of the column the aqueous sodium hydroxide solution is removed. If the sodium hydroxide solution leaving the column has a concentration of about 68% of sodium hydroxide there is obtained at the top of the column a 96.5–97.2% ethylene diamine vapour.

We claim:

1. A process for the production of substantially anhydrous ethylene diamine, which comprises subjecting the vapours of boiling aqueous ethylene diamine to a treatment with a member selected from the group consisting of an alkali metal hydroxide and concentrated alkali metal hydroxide solutions and recovering the substantially anhydrous ethylene diamine formed.

2. A process for the production of substantially anhydrous ethylene diamine which comprises supplying the aqueous ethylene diamine vapours continuously in an upward direction through an exchanger column countercurrent to alkali metal hydroxide solution and recovering the substantially anhydrous ethylene diamine formed.

3. A process for the production of substantially anhydrous ethylene diamine which comprises supplying the aqueous ethylene diamine vapours continuously in an upward direction through an exchanger column countercurrent to alkali metal hydroxide solution, the said exchanger column containing a layer of solid alkali metal hydroxide at the top end and recovering the substantially anhydrous ethylene diamine formed.

4. A process for the production of substantially anhydrous ethylene diamine which comprises supplying the aqueous ethylene diamine vapours continuously in an upward direction through an exchanger column countercurrent to alkali metal hydroxide solution of at least 60% concentration and recovering the substantially anhydrous ethylene diamine formed.

5. A process for the production of substantially anhydrous ethylene diamine which comprises supplying the aqueous ethylene diamine vapours continuously in an upward direction through an exchanger column countercurrent to alkali metal hydroxide solution of at least 60% concentration, the said column containing a layer of solid alkali metal hydroxide at the top end and recovering the substantially anhydrous ethylene diamine formed.

References Cited in the file of this patent

UNITED STATES PATENTS 2,028,041  Bersworth _____ Jan. 14, 1936

OTHER REFERENCES

Weissberger, Technique of Organic Chemistry (1950), pp. 620, 621.